US007880926B2

(12) United States Patent
Nakanishi (10) Patent No.: US 7,880,926 B2
(45) Date of Patent: Feb. 1, 2011

(54) IMAGING APPARATUS PERFORMING FLASH PHOTOGRAPHY FOR PERSONS

(75) Inventor: Takao Nakanishi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 691 days.

(21) Appl. No.: 11/764,452

(22) Filed: Jun. 18, 2007

(65) Prior Publication Data

US 2007/0291334 A1 Dec. 20, 2007

(30) Foreign Application Priority Data

Jun. 20, 2006 (JP) .............................. 2006-170265

(51) Int. Cl.
G03F 3/08 (2006.01)
(52) U.S. Cl. .................... 358/1.9; 358/509; 358/520; 396/155
(58) Field of Classification Search ................ 358/509, 358/474, 475, 909.1, 1.1, 1.9; 396/14, 61, 396/63, 65, 155, 166, 167, 213
See application file for complete search history.

(56) References Cited

U.S. PATENT DOCUMENTS

| 5,687,400 A | 11/1997 | Ishiguro et al. |
| 5,752,093 A | 5/1998 | Ishiguro et al. |
| 2005/0187437 A1* | 8/2005 | Matsugu et al. ............ 600/301 |
| 2006/0269270 A1* | 11/2006 | Yoda et al. ................ 396/155 |

FOREIGN PATENT DOCUMENTS

| JP | 8-286226 A | 11/1996 |
| JP | 8-328069 A | 12/1996 |
| JP | 2001-222048 A | 8/2001 |
| JP | 2004-320287 A | 11/2004 |

OTHER PUBLICATIONS

JP Notification of Reasons for Rejection, dispatched Sep. 11, 2009, in corresponding Japanese Application No. 2006-170265, 4 pages in English and Japanese.

* cited by examiner

Primary Examiner—Thomas D Lee
(74) Attorney, Agent, or Firm—Sughrue Mion, PLLC (57) ABSTRACT

The present invention provides an imaging apparatus comprising: an image pickup device which acquires the image of an object; an illuminating device which emits an illuminating light at a prescribed level of luminescence; an extracting device which extracts the face of a person from the image obtained from the image pickup device; a determining device which determines the facial expression and/or attributes of the person from the facial image of a person extracted from the extracting device; a corrective information storage device in which information on the quantity of correcting of the level of luminescence of the illuminating light according to the facial expression and/or attributes of the person is stored; and a correcting device which corrects the level of luminescence of the illuminating light with a quantity of correction matching the facial expression and/or attributes determined by the determining device.

19 Claims, 9 Drawing Sheets

IMAGING APPARATUS PERFORMING FLASH PHOTOGRAPHY FOR PERSONS

BACKGROUND OF THE INVENTION

1. Field of the Invention

The present invention relates to an imaging apparatus, and more particularly to an imaging apparatus which is mounted with a flash lamp and electrically images an object.

2. Description of the Related Art

In a dark scene or a backlighted scene at night or indoors, a flash lamp is used in taking a photograph. In this flash photography, flash lighting is so controlled as to achieve appropriate exposure when the object is gray in shade, such as about 18% in average reflectance.

Japanese Patent Application Laid-Open No. 8-328069 proposes to measure in this flash photography the reflectance of the main object and to control the flash lighting according to the measured reflectance so that the object can be photographed at the optimal level exposure. Japanese Patent Application Laid-Open No. 8-286226 proposes to control the flash lighting according to variations in focal distance at the time of photographing.

SUMMARY OF THE INVENTION

However, since flash lighting is so controlled as to achieve appropriate exposure over the whole picture frame instead of varying the exposure with the object in conventional flash photography, which may be a person or a landscape, there is a disadvantage that the obtained image is monotonous and lacks emphasis on the important point or points.

An object of the present invention, attempted in view of these circumstances, is to provide an imaging apparatus permitting image picking-up adapted to the characteristics of a given object.

In order to achieve the object stated above, a first aspect of the invention provides an imaging apparatus comprising an image pickup device which acquires the image of an object; an illuminating device which emits an illuminating light at a prescribed level of luminescence; an extracting device which extracts the face of a person from the image obtained from the image pickup device; a determining device which determines from the facial image of a person extracted from the extracting device the facial expression and/or attributes of the person; a corrective information storage device in which information on the quantity of correcting the level of luminescence of the illuminating light according to the facial expression and/or attributes of the person is stored; and a correcting device which corrects the level of luminescence of the illuminating light with a quantity of correction matching the facial expression and/or attributes determined by the determining device.

According to the first aspect of the invention, the illuminating device emits an illuminating light at a level of luminescence matching the facial expression (e.g. smile, crying, anger or sadness) and/or the attributes (e.g. the age level or sex) of the object person. This enables imaging to be accomplished with emission of an illuminating light matching the given object.

In order to achieve the object stated above, a second aspect of the invention provides a version of the imaging apparatus according to the first aspect further provided with a modifying device which individually modifies the quantities of correction stored in the corrective information storage device.

According to the second aspect of the invention, the photographer can modify the level of luminescence of the illuminating light as desired. This enables each photographer to easily shoot an image matching his or her preference.

In order to achieve the object stated above, a third aspect of the invention provides a version of the imaging apparatus according to the second aspect wherein the modifying device is provided with an image acquiring device which acquires an image picked up with an illuminating light emitted from the illuminating device after correcting the level of luminescence with the quantity of correction to be modified; an input device which inputs the quantity of correction; an image generating device which generates an image supposed to be obtained after correction with the quantity of correction inputted from the input device by correcting the image acquired from the image acquiring device according to the quantity of correction inputted from the input device; a display device which displays the image generated by the image generating device; and an instructing device which instructs the finalization of the quantity of correction inputted from the input device, wherein the quantity of correction finalized by the instructing device is used as the quantity of modification of the quantity of correction selected by a selecting device.

According to the third aspect of the invention, the level of luminescence of the illuminating light can be modified while confirming the effect of modification. Thus, when the quantity of correction is inputted from the input device, the image supposed to be obtained after the correction based on the quantity of correction is generated by the image generating device, and the generated image is displayed on the display device. The photographer, checking the image displayed on the display device and judging that the modification is appropriate, instructs with the instructing device to finalize the quantity of correction. In this way, he or she is enabled to modify the level of luminescence of the illuminating light while checking what extent of modification can be achieved with how much modification.

In order to achieve the object stated above, a fourth aspect of the invention provides a version of the imaging apparatus according to the third aspect further provided with a recording instruction device which instructs recording of the image generated by the image generating device; and a recording control device which records on a recording medium in accordance with the recording instruction by the recording instruction device the image generated by the image generating device.

According to the fourth aspect of the invention, an image generated when the level of luminescence of the illuminating light has been modified can be recorded.

The imaging apparatus according to the invention permits image picking-up adapted to the characteristics of a given object.

DETAILED DESCRIPTION OF THE PREFERRED EMBODIMENTS

An imaging apparatus, which is a preferred embodiment of the present invention, will be described below with reference to the accompanying drawings.

Figure 1:
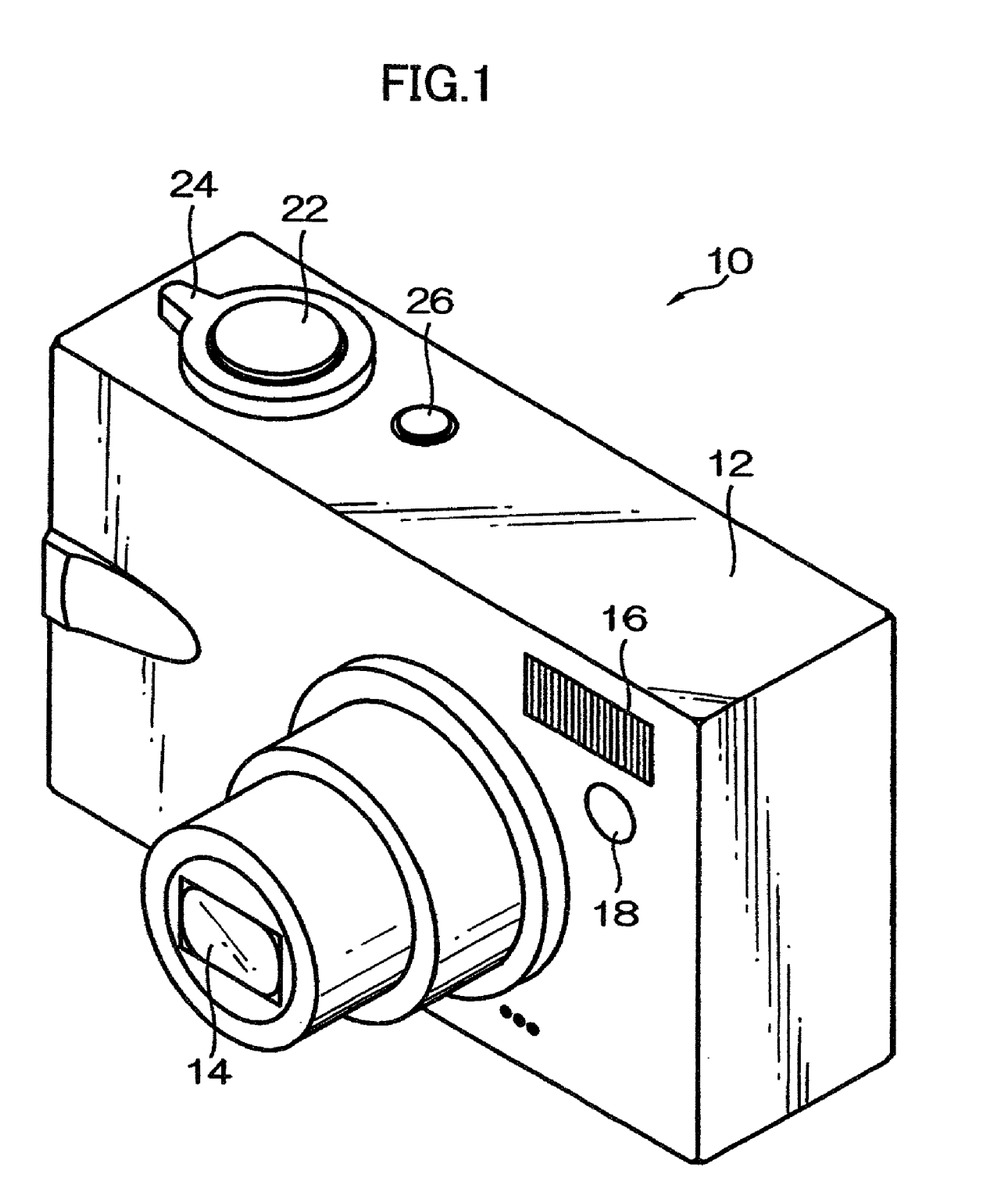
FIG. 1 shows a front perspective view of the exterior of a digital camera.
Figure 2:
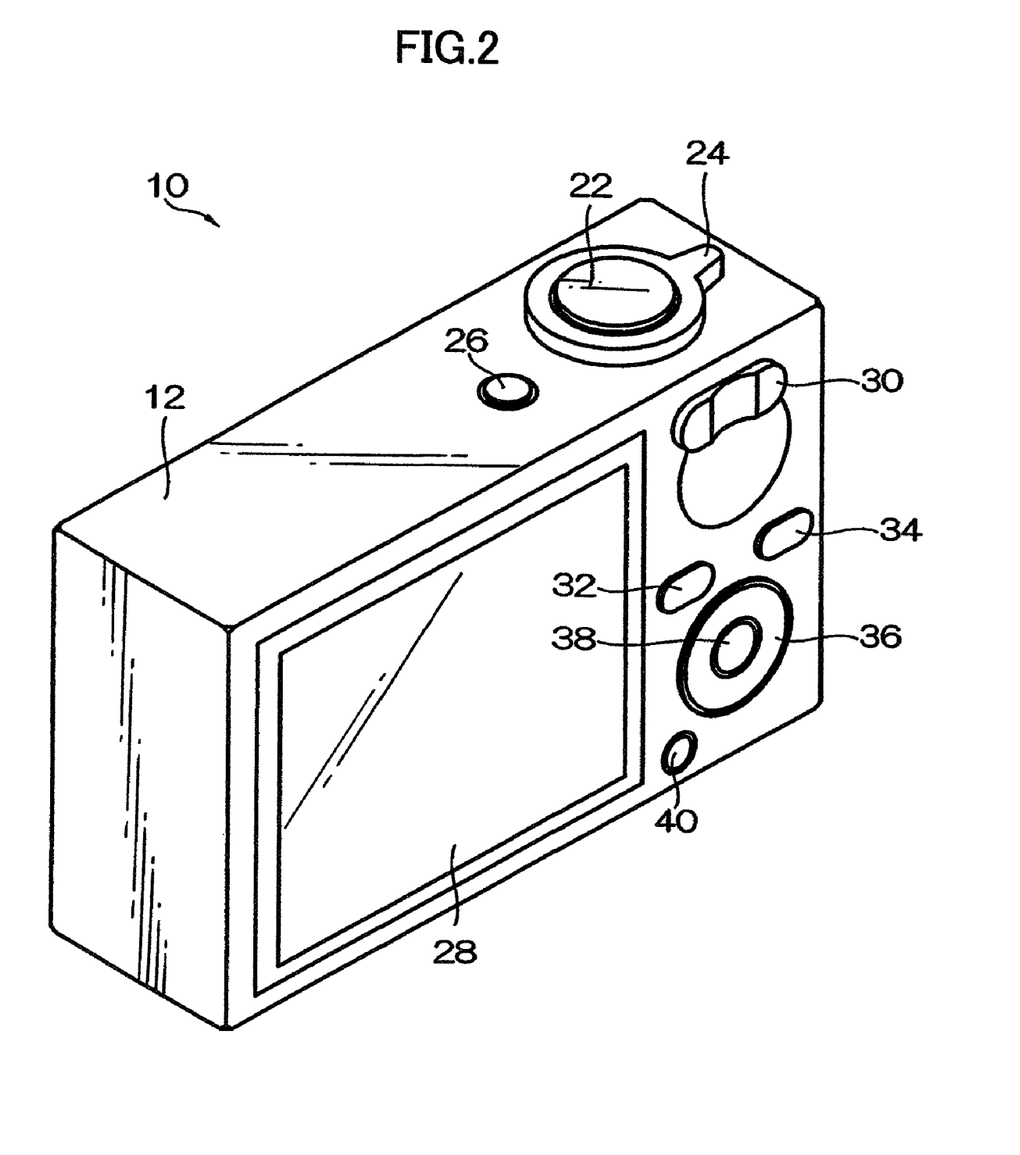
FIG. 2 shows a rear perspective view of the exterior of the digital camera.

FIG. 1 and FIG. 2 are a front perspective view and a rear perspective view, respectively, of the exterior of a digital camera to which the invention is applied.

As illustrated therein, this digital camera 10 is a so-called compact camera, whose camera body 12 is formed in a thin rectangular box shape.

On the front face of the camera body 12, an image pickup lens 14, a flash lamp 16, a loudspeaker 18, an AF auxiliary lamp 20 and other elements are disposed as shown in FIG. 1, and a shutter release button 22, a mode selector lever 24, a power switch button 26 and others are arranged on the top face.

On the other hand, on the rear face of the camera body 12 a monitor screen 28, a zooming button 30, a playback button 32, a function button 34, a cross button assembly 36, a MENU/OK button 38, a DISP/BACK button 40 and other elements are arranged as shown in FIG. 2.

Further, though not shown, a screw hole for a tripod and an openable battery cover are provided in or on the bottom face of the camera body 12, and a battery housing for accommodating a battery and a memory card slot for accepting a memory card are disposed within the battery cover.

The image pickup lens 14 is a submersible zoom lens which, when power supply to the digital camera 10 is turned on, emerges from inside the camera body 12. The specific configurations of the zooming mechanism and the submersion mechanism of the image pickup lens 14 will not be described here as they embody known techniques.

The flash lamp 16 has a xenon tube, for instance, as its light source, and the level of its luminescence is adjustable. A xenon tube is not the only available choice, but a flash lamp having a high luminance LED as the light source can be used as well.

The AF auxiliary lamp 20, configured of a high luminance LED for instance, is lit as required during auto-focusing.

The shutter release button 22 is a double stroke switch permitting so-called "half pressing" and "full pressing". When this shutter release button 22 is half-pressed, the digital camera 10 performs preparatory processing for picking up a picture, including automatic exposure (AE), auto-focusing (AF) and automatic white balancing (AWB), and when the button is fully pressed, the camera takes a picture or otherwise processes recording.

The mode selector lever 24 is used for setting the imaging mode. This mode selector lever 24 is enabled to oscillate around the shutter release button 22 within a prescribed range of angles, and can be set in an "SP position", "AUTO position", "M position" or "moving picture position". By setting this mode selector lever 24 to the "SP position", the digital camera 10 is set to a "scene program pickup mode", a mode in which the exposure and other aspects of image picking-up are controlled to match the given scene to be picked up. By setting it to the "AUTO position", the camera is set to an "automatic pickup mode", in which the exposure is controlled fully automatically. Or by setting it to the "M position", the camera is set to a "manual pickup mode", in which the exposure is manually set. Or by setting it to the "moving picture position", the camera is set to a "moving picture pickup mode" in which a moving picture is picked up. Available "scene program pickup modes" include, for instance, a "portrait mode" in which a person is shot, a "landscape mode" in which a landscape is shot, a "sports mode" in which a sports scene is shot, a "night mode" in which a night scene is shot and an "underwater mode" in which underwater shooting is done.

The power switch button 26 is used for turning on and off power supply to the digital camera 10. By pressing it down for a prescribed length of time (e.g. two seconds), power supply to the digital camera 10 is turned on or off.

The monitor screen 28 is formed of a color LCD. This monitor screen 28 is used not only as an image display unit for displaying a picked-up image but also as a graphical user interface (GUI) when setting the mode or the like. While shooting a picture, the image caught by an imaging element is displayed in a see-through manner to make the screen serve as an electronic view finder.

The zooming button 30, used for zooming the image pickup lens 14, is formed of a zoom-in button for instructing zooming toward the telephoto side and a zoom-out button for instructing zooming toward the wide angle side.

The playback button 32 is used for instructing a switch-over to the playback mode. Thus, when this playback button 32 is pressed while a picture is being taken, the digital camera 10 is switched over to this playback mode. Or when this playback button 32 is pressed while the power supply is off, the digital camera 10 is actuated in the playback mode.

The function button 34 is used for calling one or another of various setting screens for imaging and playback functions. Thus, when this function button 34 is pressed while a picture is being taken, a setting screen for the image size (the number of recorded pixels), sensitivity or the like is displayed on the monitor screen 28, or when this function button 34 is pressed during playback, a setting screen for a digital print order format (DPOF) is displayed on the monitor screen 28.

The cross button assembly 36 is disposed to permit pressing in four directions including the upward, downward, leftward and rightward directions, each directional button being assigned a function matching the set state of the camera. For instance, when a picture is being taken, the leftward button is assigned a function to turn on or off the macro function and the rightward button, a function to change over the flash mode. The upward button is assigned a function to vary the brightness of the monitor screen 28 and the downward button, a function to turn on or off the self-timer. During playback, the leftward button is assigned a function of frame-by-frame playback and the rightward button, a function of frame-by-frame rewinding. The upward button is assigned a function to vary the brightness of the monitor screen 28 and the downward button, a function to delete the image being played back. In various manners of setting, a function to move the cursor displayed on the monitor screen 28 in the direction of each button is assigned.

In the digital camera 10 of this embodiment, the available flash modes include automatic lighting, forced lighting, lighting prohibition and scene lighting. When the scene lighting mode is selected, the flash lamp is lit at a level of luminescence matching the facial expression of the object. This point will be described in further detail afterwards.

The MENU/OK button 38 is used for calling the menu screen (MENU function) as well as for finalizing a choice and instructing the execution of processing (OK function). The function to be assigned differs with the set state of the digital camera 10.

The DISP/BACK button 40 is used for instructing a change-over of the displayed content on the monitor screen 28 (DISP function) as well as for instructing cancellation of an input operation or the like (BACK function). The function to be assigned differs with the set state of the digital camera 10.

Figure 3:
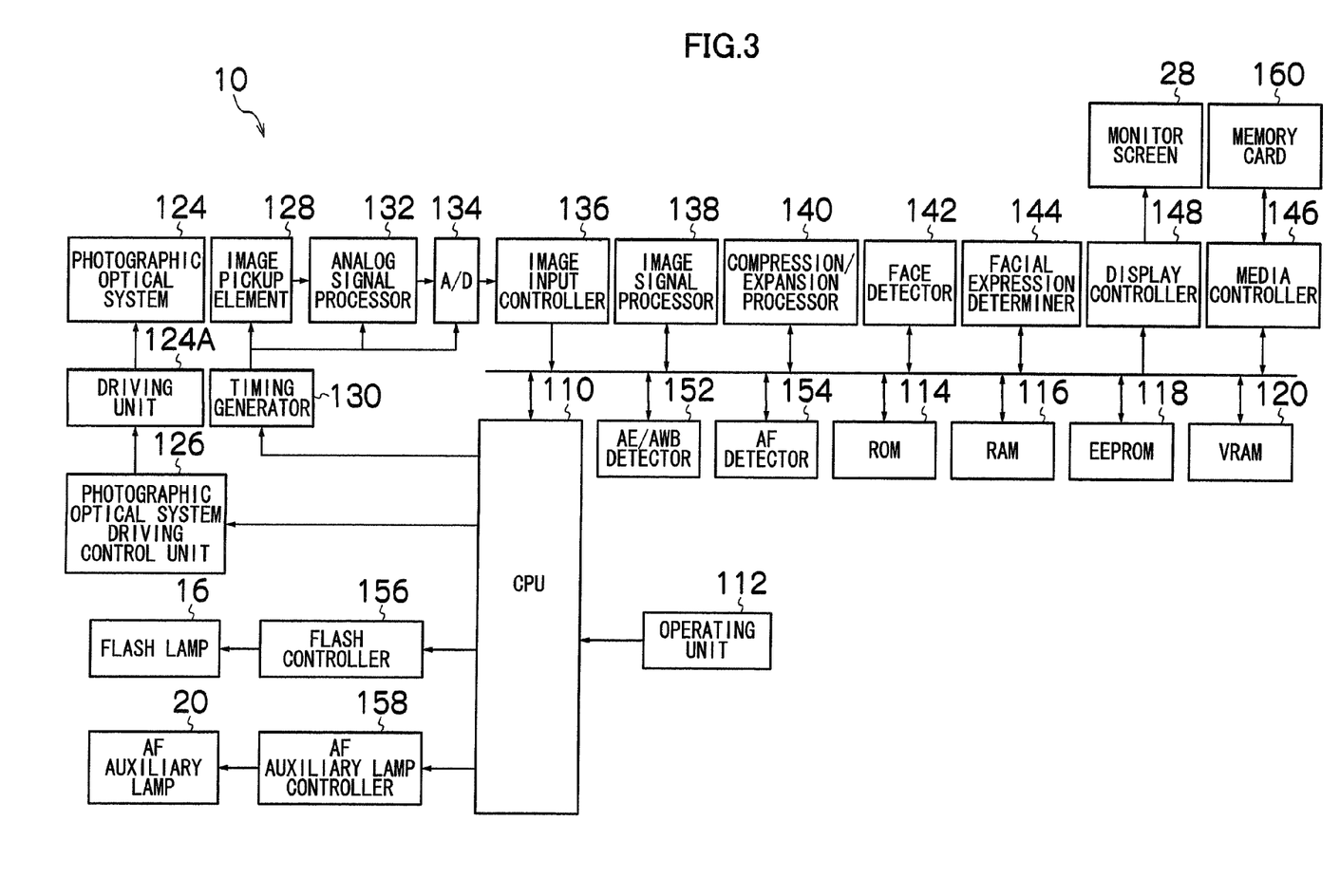
FIG. 3 is a block diagram showing the electrical configuration of the digital camera.

FIG. 3 is a block diagram showing the electrical configuration of the digital camera 10 of this embodiment.

As shown in this diagram, the digital camera 10 comprises a CPU 110, an operating unit 112 (including the shutter release button 22, mode selector lever 24, power switch button 26, zooming button 30, playback button 32, function button 34, cross button assembly 36, MENU/OK button 38 and DISP/BACK button 40), a ROM 114, a RAM 116, an EEPROM 118, a VRAM 120, a photographic optical system 124, a photographic optical system driving control unit 126, an image pickup element 128, a timing generator 130, an analog signal processor 132, an A/D converter 134, an image input controller 136, an image signal processor 138, a compression/expansion processor 140, a face detector 142, a facial expression determiner 144, a media controller 146, a display controller 148, an AE/AWB detector 152, an AF detector 154, a flash controller 156 and an AF auxiliary lamp controller 158.

The CPU 110, functioning not only as a control unit for overall regulation of the operations of the digital camera 10 but also as an arithmetic unit for performing various arithmetic operations, controls the different parts of the digital camera 10 in accordance with prescribed control programs on the basis of inputs from the operating unit 112.

Control programs to be executed by this CPU 110 and various sets of data needed for controls are stored in the ROM 114, and various items of setting information including user-set information are stored in the EEPROM 118. As will be described afterwards, information on levels of luminescence matching facial expressions is recorded in the ROM 114, and information on the quantities of their correction is recorded in the EEPROM 118.

The RAM 116 is used not only as the work area of the CPU 110 but also as a temporary storage area of image data, and the VRAM 120 is used as a temporary storage area solely of image data to be displayed.

The photographic optical system 124 comprises the image pickup lens 14, an iris and a shutter, and each constituent element operates driven by a driving unit 124A composed of an actuator, such as a motor. For instance, the focusing lens group constituting the image pickup lens 14 is driven by a focusing motor to move back and forth, and the zoom lens group is driven by a zooming motor to move back and forth. The iris is driven by an iris motor to expand or contract, and the shutter is driven by a shutter motor to be released or closed.

The photographic optical system driving control unit 126 controls the driving unit 124A of the photographic optical system 124 as instructed from the CPU 110, and regulates the operations of the image pickup lens 14, iris and shutter.

The image pickup element 128, formed of color CCDs of a prescribed color filter array for instance, electronically picks up the image of an object formed by the photographic optical system 124. A timing generator (TG) 130 outputs a timing signal for driving this image pickup element 128 as instructed from the CPU 110.

The analog signal processor 132 subjects image signals outputted from the image pickup element 128 to correlated double sampling process (processing to obtain accurate pixel data by determining the difference between the fed-through component level and the pixel signal component level contained in the output signal of each pixel from the image pickup element for the purpose of reducing noise (particularly thermal noise) contained in the output signals of the image pickup element), amplifies the signals so processed and outputs them.

The A/D converter 134 converts R, G and B analog image signals outputted from the analog signal processor 132 into digital image signals.

The image input controller 136, having a line buffer of a prescribed capacity, accumulates as instructed from the CPU 110 image signals equivalent to one image outputted from the A/D converter 134, and stores them into the RAM 116.

The image signal processor 138, comprising a synchronizing circuit (a circuit for processing interpolation into spatial lags of color signals ensuing from the color filter array of single CCD and thereby converting the color signals into simultaneous ones), a white balance correcting circuit, a gamma correcting circuit, a contour correcting circuit and a luminance/color-difference signal generating circuit, subjects inputted image signals to required signal processing as instructed from the CPU 110 to generate image data (YUV data) composed of luminance data (Y data) and color-difference data (Cr, Cb data).

The compression/expansion processor 140 subjects inputted image data to compression processing of a prescribed format as instructed from the CPU 110 to generate compressed image data. It also subjects inputted compressed image data to expansion processing of a prescribed format as instructed from the CPU 110 to generate non-compressed image data.

The face detector 142 extracts from inputted image data the face area in the image as instructed from the CPU 110. This extraction of the face area is accomplished by, for instance, extracting skin color data from the original image and then extracting as the face the cluster of photometric points which has been determined as the skin-colored range. Other known methods of extracting the face area from the image include one by which the face area is determined by converting photometric data into hues and color saturations, and creating and analyzing two-dimensional histograms of the converted hues and color saturations; another by which a face candidate area corresponding to the shape of a human face is extracted and the face area is determined from characteristic quantities in the area; still another by which the contour of a human face is extracted from an image and the face area is determined on that basis; and yet another by which a human face is extracted by preparing a plurality of templates shaped like a face, calculating the correlation between the templates and the image, and choosing a face candidate area according to this correlation. Face area extraction can be achieved by any of these methods.

The facial expression determiner 144 distinguishes as instructed from the CPU 110 the facial expression of the human face detected by the face detector 142. For instance, it extracts from inputted image data the positions and shapes of the characteristic regions (eyes, nose, mouth and so on) of the face detected by the face detector 142, and distinguishes the facial expression on the basis of the measured quantities of these factors. Other available techniques for distinguishing the facial expression from an image include, for instance, articles in the technical report (in Japanese) on the Nov. 18-19, 1999 meeting of The Institute of Electronics, Information and Communication Engineers (IEICE), such as PRMU99-106 "Gesture recognition sturdy against changes in moving position" by Hiroyuki Amada, Motoyuki Suzuki, Hideaki Goto and Shozo Makino (Tohoku University), PRMU99-138 "Automatic extraction of facial organs and automation of facial expression recognition" by Hiroshi Kobayashi, Hisanori Takahashi and Kosei Kikuchi (Science University of Tokyo), PRMU99-139 "Presumption of face area and facial expression recognition using a potential net" by Hiroaki Bessho (Laboratories of Image Information Science and Technology), Yoshio Iwai and Masahiko Yachida (Osaka University), PRMU99-140 (special lecture) "Research on facial expression cognition and image processing technology" by Hiroshi Yamada (Nihon University/AIR) and PRMU99-142 (specially invited paper) "Analysis and recognition of human actions for interactions" by Masahiko Yachida and Yoshio Iwai (Osaka University). Any of these techniques can be used.

In this description, human facial expressions are classified into that of smile, weeping, anger, sadness and absence of expression (including ambiguity), and a given expression is determined as belonging to one or another of these types.

The media controller 146 controls, as instructed from the CPU 110, writing/reading of data in or out of a memory card 160 fitted in a medium slot.

The display controller 148 controls displaying on the monitor screen 28 as instructed from the CPU 110. Thus, as instructed from the CPU 110, it converts inputted image signals into video signals for displaying on the monitor screen 28 (e.g. NTSC signals, PAL signals or SCAM signals) and outputs them to the monitor screen 28, and also outputs prescribed characters and graphic information to the monitor screen 28.

The AE/AWB detector 152, as instructed from the CPU 110, figures out from inputted image signals physical quantities required for AE control and AWB control. For instance, as a physical quantity required for AE control, one screen is divided into a plurality of areas (e.g. 16×16), and the accumulated value of R, G and B image signals is figured out for each divided area. The CPU 110 computes the brightness of the object (object luminance) on the basis of this accumulated value obtained from the AE/AWB detector 152, and figures out the suitable exposure for photographing (photographic EV value). The iris count and the shutter speed are determined on the basis of the figured-out photographic EV value and a prescribed program chart. Further, as a physical quantity required for AWB control, one screen is divided into a plurality of areas (e.g. 16×16), and the average accumulated value for each color of R, G and B image signals is figured out for each divided area. The CPU 110 figures out the R/G and B/G ratios for each divided area from the obtained accumulated value of R, that of B and that of G, and determines the type of light source on the basis of the distribution of the figured-out R/G and B/G ratios in the color spaces of R/G and B/G and other relevant factors. Then according to white balance adjustment values appropriate for the determined light source type, the gains for the R, G and B signals of the white balance adjusting circuit (white balance correction values) are so determined as to make the value of each ratio, for instance, approximately 1 (namely to make the accumulated RGB ratio R:G:B≈1:1:1 in one screen).

The AF detector 154 figures out from inputted image signals physical quantities required for AF control as instructed from the CPU 110. In the digital camera 10 of this embodiment, AF control is carried out according to the contrast of the image obtained from the image pickup element 128 (so-called contrast AF), and the AF detector 154 figures out a focus evaluation value, representing the sharpness of the image, from inputted image signals. The CPU 110 detects the position where this focus evaluation value figured out by the AF detector 154 reaches its maximum, and shifts the focusing lens group to that position. Thus, it shifts the focusing lens group from an extreme near position to an infinitely distant one by prescribed steps, acquires a focus evaluation value in each position, and shifts the focusing lens group to the position where the obtained focus evaluation value is the greatest, the position being regarded as the in-focus position.

The flash controller 156 controls light emission from the flash lamp 16 as instructed from the CPU 110.

The AF auxiliary lamp controller 158 controls light emission by the AF auxiliary lamp 20 as instructed from the CPU 110. Thus the CPU 110, when it finds the object too dark during AF or the object has a low contrast, executes AF control by causing via the AF auxiliary lamp controller 158 the AF auxiliary lamp 20 to emit light and irradiate the object with AF auxiliary light.

The actions of the digital camera 10 of this embodiment configured as described so far will now be described.

First, the sequence of processing to pick up an image without lighting the flash lamp will be outlined.

When the power switch button 26 is pressed down to turn on power supply to the digital camera 10, the digital camera 10 is actuated in the pickup mode.

First, the driving unit 124A of the photographic optical system 124 is driven via the photographic optical system driving control unit 126, and the image pickup lens 14 is protruded to a prescribed position. When the image pickup lens 14 has been protruded to a prescribed position, the image pickup element 128 shoots for a see-through image, and the see-through image is displayed on the monitor screen 28. Thus, images are consecutively picked up by the image pickup element 128, and their image signals are consecutively processed to create image data for the see-through image. The created image data is successively entered into the display controller 148 via the VRAM 120 and converted into a signal form for display use to be outputted to the monitor screen 28. In this way, the image picked up by the image pickup element 128 is displayed on the monitor screen 28 in a see-through manner. The photographer looks at this see-through image displayed on the monitor screen 28, determines his or her composition on that basis, and half-presses the shutter release button 22.

When the shutter release button 22 is half-pressed, an S1ON signal is inputted to the CPU 110. In response to this S1ON signal, the CPU 110 executes preparations for shooting, namely the processing of AE, AF and AWB.

The image signals outputted from the image pickup element 128 are captured into the RAM 116 via the analog signal processor 132, the A/D converter 134 and the image input controller 136, and entered into the AE/AWB detector 152 and the AF detector 154.

The AE/AWB detector 152 figures out from the inputted image signals physical quantities required for AE control and AWB control, and outputs them to the CPU 110. On the basis of this output from the AE/AWB detector 152, the CPU 110 determines the iris count and the shutter speed, and at the same time determines the value of white balance correction.

Also, the AF detector 154 figures out from the inputted image signals physical quantities required for AF control, and outputs them to the CPU 110. On the basis of this output from the AF detector 154, the CPU 110 controls the driving of the driving unit 124A of the photographic optical system 124 via the photographic optical system driving control unit 126 to regulate the shifting of the focusing lens to focus the image pickup lens 14 on the main object. In this process, the CPU 110 lights the AF auxiliary lamp 20 as required to execute AF control.

The photographer looks at the see-through image displayed on the monitor screen 28 to check the focusing state and other aspects of the image pickup lens 14, and executes shooting. That means, the shutter release button 22 is fully pressed.

When the shutter release button 22 is fully pressed, an S2ON signal is inputted to the CPU 110. In response to this S2ON signal, the CPU 110 processes shooting and recording.

First, the image pickup element 128 is exposed to light at the iris count and the shutter speed obtained by the AE processing described above to pick up an image to be recorded.

The image signals for recording outputted from the image pickup element 128 are captured into the image input controller 136 via the analog signal processor 132 and the A/D converter 134, and stored into the RAM 116. The image signals stored into the RAM 116 are entered into the image signal processor 138 under the control of the CPU 110. The image signal processor 138 subjects the inputted image signals to a prescribed signal processing to generate image data (YUV data) comprising luminance data and color-difference data.

The image data generated by the image signal processor 138, after being temporarily stored into the RAM 116, are entered into the compression/expansion processor 140. The compression/expansion processor 140 subjects the inputted image data to prescribed compression processing to generate compressed image data.

The compressed image data is stored into the RAM 116, and recorded into the memory card 160 via the media controller 146 as a still image file of a prescribed format (e.g. Exif).

The image data recorded into the memory card 160 in this way are played back on the monitor screen 28 by setting the digital camera 10 to the playback mode. The shift to the playback mode is accomplished by pressing down the playback button 32.

When the playback button 32 is pressed down, the CPU 110 reads out of the memory card 160 via the media controller 146 the compressed image data of the last recorded image file.

The compressed image data read out of the memory card 160 is entered into the compression/expansion processor 140 to be converted into non-compressed image data, which is then entered into the VRAM 120. The non-compressed image data is outputted from the VRAM 120 to the monitor screen 28 via the display controller 148. This causes the image recorded on the memory card 160 to be played back on the monitor screen 28.

Frame-by-frame playback of images is accomplished by manipulating the right and left keys of the cross button assembly 36. When the right key is manipulated, the next image file is read out of the memory card 160, and played back on the monitor screen 28. Or when the left key of the cross button assembly 36 is manipulated, the immediately preceding image file is read out of the memory card 160, and played back on the monitor screen 28.

Next, the sequence of processing to pick up an image with lighting emitted from the flash lamp will be outlined.

As stated above, in the digital camera 10 of this embodiment, the flash modes including automatic lighting, forced lighting, lighting prohibition and scene lighting are available.

In the automatic lighting mode here, the flash lamp is automatically lit when the AE result indicates that the object is dark, and in the forced lighting mode the lighting of the flash lamp is forced regardless of the brightness or darkness of the object. On the other hand, in the scene lighting mode, the flash lamp is lit at a level of luminescence matching the facial expression of the object.

Since the automatic lighting and forced lighting modes are common modes, the sequence of processing of flash photography in the scene lighting mode will be described here.

Figure 4:
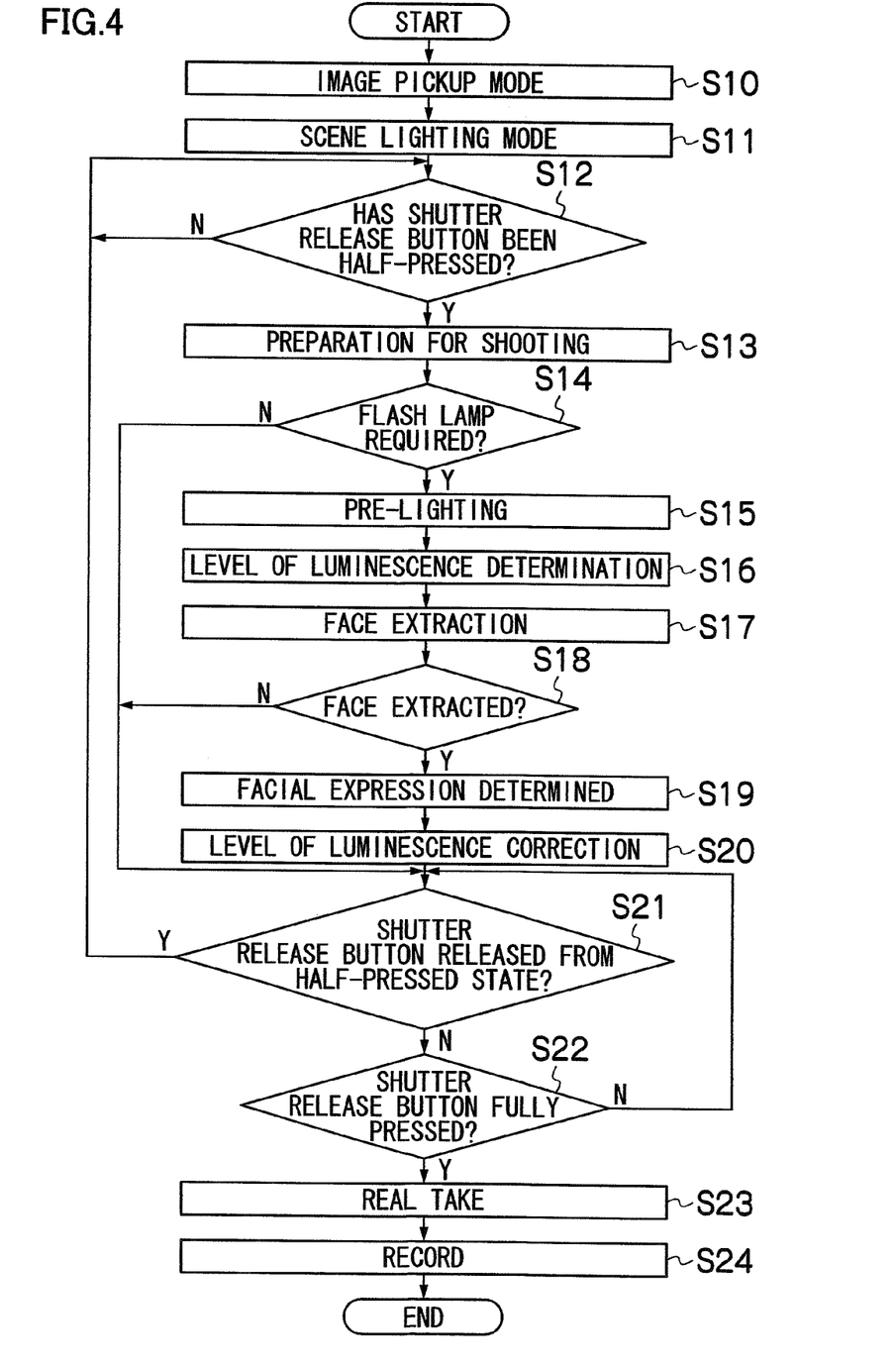
FIG. 4 is a flow chart showing the sequence of photographic processing by the digital camera in the scene lighting mode.

FIG. 4 is a flow chart showing the sequence of photographic processing by the digital camera in the scene lighting mode.

First, the camera is set in the pickup mode (step S10), and the flash lamp is set in the scene lighting mode (step S11).

When the flash lamp is set in the scene lighting mode under the pickup mode in this way, the CPU 110 determines whether or not the shutter release button 22 has been half-pressed according to an input from the operating unit 112 (step S12). If it determines that the shutter release button 22 is half-pressed, the CPU 110 prepares for shooting (step S13). Namely, it executes processing of AE, AF and AWB.

The CPU 110 then determines from the result of AE whether or not lighting of the flash lamp 16 is required (step S14) and, if it finds the lighting required, pre-lights the flash lamp 16 (step S15) and determines the level of luminescence of the flash lamp 16 required in the real take on the basis of the reflection of the pre-lighting (step S116).

After that, the CPU 110 processes extraction of any human face area from an image obtained from the image pickup element 128 (step S17). Thus, it picks up an image for face extraction with the image pickup element 128, and enters the image data obtained by that picking-up into the face detector 142 to have the face area extracted. The CPU determines the presence or absence of any human face according to the result of that extraction processing (step S118).

If the result of this determination reveals the presence of a human face, the CPU 110 processes determination of the expression of the extracted face (step S19). Thus, it enters the image data picked up for the face extracting purpose into the facial expression determiner 144 to have the human facial expression detected by the face detector 142 determined.

The CPU 110 corrects the level of luminescence of the flash lamp 16 on the basis of the result of determination by this facial expression determiner 144 (step S20). Thus, it corrects, according to the result of determination of the facial expression, the level of luminescence of the flash lamp 16 in the real take obtained on the basis of the reflection of the pre-lighting.

The information on the quantity of correction of the level of luminescence according to the facial expression here is stored in the EEPROM 118, and the CPU 110, referencing this information on the quantity of correction stored in the EEPROM 118, corrects the level of luminescence of the flash lamp 16.

The quantity of correction is prescribed for each type of facial expression, and the CPU 110 corrects the level of luminescence of the flash lamp 16 for each type of facial expression according to the result of determination by the facial expression determiner 144. In this case, as facial expressions are classified into those of smile, weeping, anger, sadness and absence of expression, a quantity of correction is set for each type of facial expression (e.g. +2 steps for smile, −1 step for weeping, −2 steps for anger, −1 step for sadness, and ±0 step for absence of expression).

When a person is included in the potential image to be picked up, the person's face is detected, and the level of luminescence of the flash lamp 16 is corrected according to the facial expression of the person. When no human face is involved, namely it is determined at step S18 that no human face has been extracted, the level of luminescence of the flash lamp 16 is not corrected, but the level of luminescence figured out from the result of pre-lighting is directly used as the level of luminescence of the flash lamp 16 in the real take.

After that, the CPU 110 determines whether or not the shutter release button 22 has been released from the half-pressed state (step S21) and, if it has been released, returns to step S12 to execute again the above-described processing in response to the half-pressing of the shutter release button 22.

On the other hand, if it is determined that the shutter release button 22 has not been released from the half-pressed state, it is determined whether or not the shutter release button 22 has been fully pressed (step S22) and, if it has been fully pressed, executes the real take (step S23) to record the obtained image into the memory card 160 (step S24). If the flash lamp 16 is to be lit in this process, the flash lamp 16 is lit at the set level of luminescence and the real take is executed.

As described so far, the digital camera 10 of this embodiment, if it detects any human face when flash light is set in the scene lighting mode, adjusts the level of luminescence of the flash lamp 16 according to the expression on the face, and therefore it can pick up an image matching the object.

Although this embodiment includes smile, weeping, anger, sadness and absence of expression as facial expressions that can be determined by the facial expression determiner 144, even finer classification for determination may be also conceivable. This would enable the object to be shot in a mode of flash lighting suitable for it and the important point or points to be properly emphasized.

While the flash lamp 16 is pre-lit in this embodiment as the reference for figuring out the right level of luminescence of the flash lamp 16 for the real take, the method of automatically controlling flash light is not limited to this, but any other appropriate automatic light control method can be used. For instance, a light control sensor can be used to automatically control the flash lighting. In this case, also, the level of luminescence of flash lighting would be corrected according to the facial expression.

Although the level of luminescence of the flash lamp 16 is corrected in this embodiment according to the facial expression of the person to be photographed, the level of luminescence of the flash lamp 16 may as well be corrected according to the person's attributes including the age bracket and the sex. For instance, the person may be determined whether he or she is a child or grown-up according to the facial image extracted, and the level of luminescence of the flash lamp 16 corrected according to the result of determination. Or the sex of the person may be determined according to the facial image extracted, the level of luminescence of the flash lamp 16 corrected according to the result of determination. Or a combination of these attributes may be determined, and the level of luminescence of the flash lamp 16 corrected according to the result of determination. For instance, the person may be determined as to age, sex and further his or her facial expression, and the level of luminescence of the flash lamp 16 corrected according to the result of determination. In this case, the quantity of correcting the level of luminescence is determined for each of the patterns into which the classification is made.

While the quantity of correction is preset for each type of facial expression in this embodiment, the preset quantity of correction may be made individually modifiable by the user. An example of this correction method will be described below.

Figure 5:
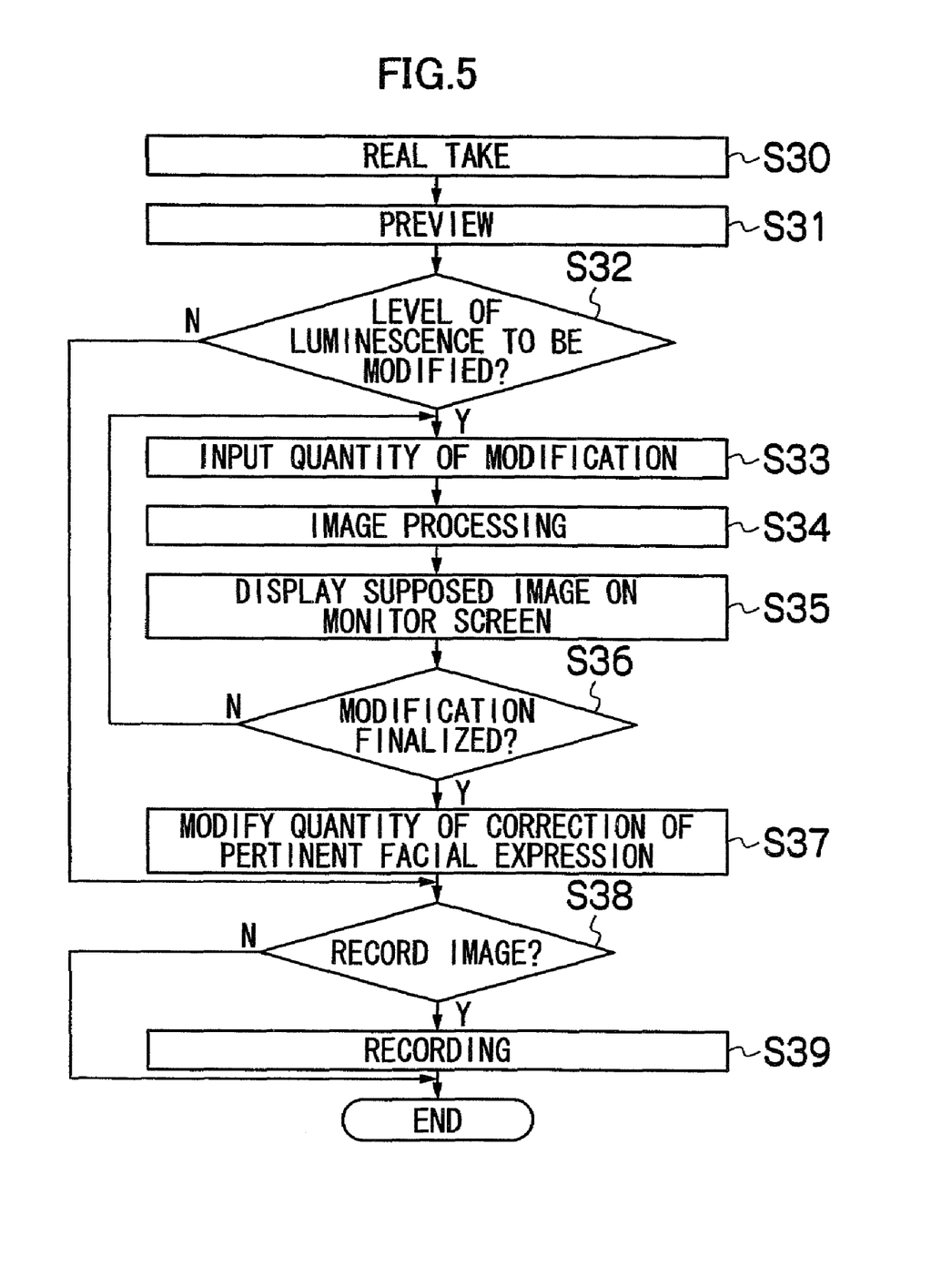
FIG. 5 is a flow chart showing the sequence of modifying the quantity of correction.

FIG. 5 is a flow chart showing the sequence of modifying the set quantity of correction.

As charted here, modification of the quantity of correction is executed after the real take.

Figure 6A:
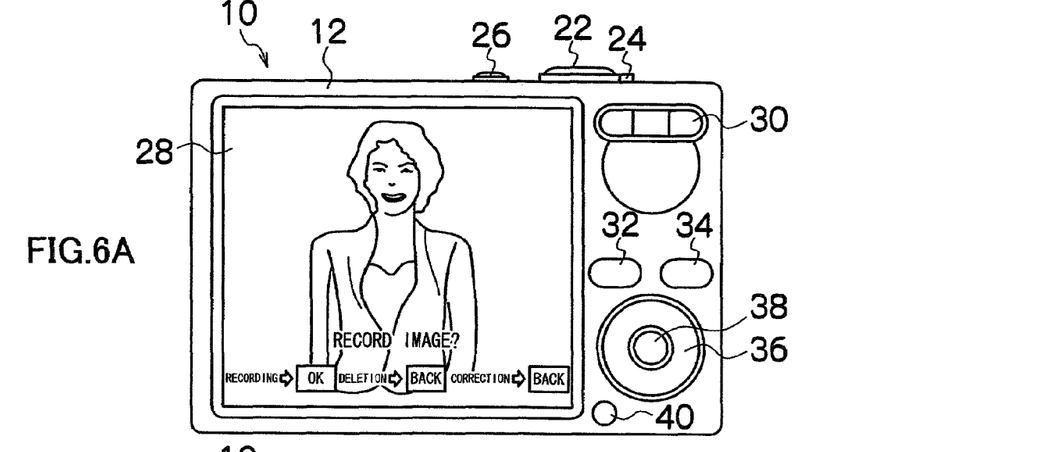
FIGS. 6A, 6B and 6C show examples of display on the monitor screen when the quantity of correction is modified.

First, when the real take is executed (step S30), the image obtained by the real take is displayed on the monitor screen 28 for preview as shown in FIG. 6A (step S31). Thus, the image data of the picked-up image are stored into the RAM 116 as well as into the VRAM 120 after being generated by the image signal processor 138, and outputted from the VRAM 120 to the monitor screen 28 via the display controller 148. The photographer, looking at this image displayed on the monitor screen 28, judges whether or not the quantity of correction requires modification. If the photographer finds it necessary, he or she presses down the function button 34. The CPU 110, determining whether or not this function button 34 has been pressed down, determines whether or not the quantity of correction requires modification (step S32).

Figure 6B:
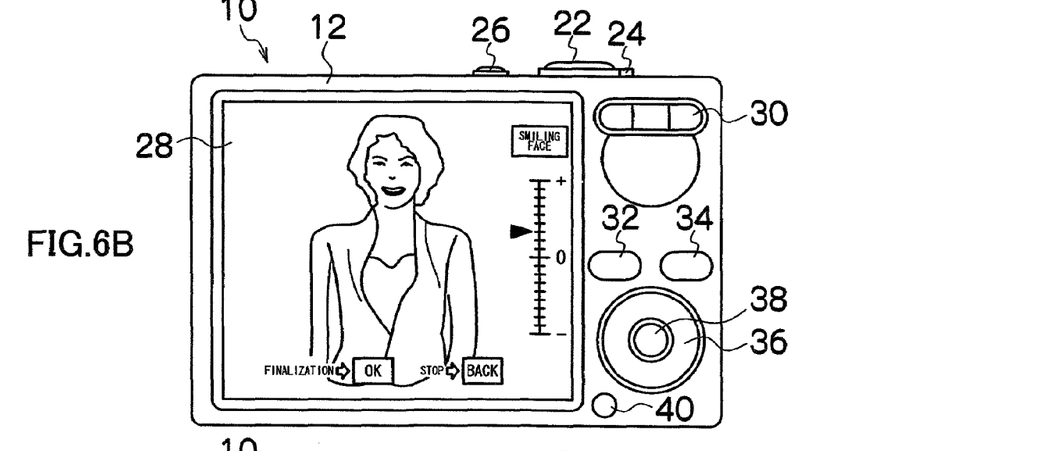

When the function button 34 has been pressed down and modification of the quantity of correction is instructed, the CPU 110 switches over the display on the monitor screen 28 to a screen for modifying the quantity of correction as shown in FIG. 6B, and accepts inputting of the quantity of modification (step S33).

The inputting of the quantity of modification here is accomplished with the cross button assembly 36. Every time the upward button of the cross button assembly 36 is pressed, the quantity of modification is raised by a step, and every time the downward button is pressed, the quantity of modification is lowered by a step. As shown in FIG. 6B, the quantity of modification is displayed in graduations superposed over the preview image on the screen for modifying the quantity of correction, so that the inputted quantity of modification can be confirmed. Further, the type of facial expression to be modified (the facial expression on the previewed image determined at the time of shooting) is displayed to indicate which type of facial expression the modification of the quantity of correction is intended for. In the example of FIG. 6B, the quantity of correction of an image determined to represent a smiling face is to be corrected.

The CPU 110, every time the upward button or the downward button of the cross button assembly 36 is pressed, subjects the picked-up image to required image processing, for instance processing to change the brightness, to generate an image supposed to be obtained after the modification (supposed image) (step S34). Thus, as every time the upward button of the cross button assembly 36 is pressed once, the quantity of modification is raised by one step and the quantity of correction is also raised by one step in the plus direction, the level of luminescence is corrected at that quantity of correction to generate by image processing an image supposed to be obtained in flash photography. Similarly, as every time the downward button of the cross button assembly 36 is pressed once, the quantity of modification is lowered by one step and the quantity of correction is also lowered by one step in the minus direction, the level of luminescence is corrected at that quantity of correction to generate by image processing an image supposed to be obtained in flash photography. This image processing is accomplished by the image signal processor 138, and the CPU 110 enters image data stored in the RAM 116 into the image signal processor 138 to have required signal processing to be executed. The image data of the supposed image so generated are stored into the VRAM 120. The CPU 110 enters image data of this supposed image stored in the VRAM 120 into the display controller 148 to cause them to be displayed on the monitor screen 28 (step S35).

The photographer looks at this supposed image displayed on the monitor screen 28 to judge whether or not further modification is required. If the photographer finds it necessary, he or she manipulates the cross button assembly 36 to input a quantity of modification. Or if the photographer finds the modification has been appropriately done, he or she presses down the MENU/OK button 38 to instruct finalization of the quantity of modification.

The CPU 110 determines according to an input from the operating unit 112 whether or not the quantity of modification has been finalized (step S36). If it determines that the quantity of modification has not been finalized, it returns to step S33 and executes image processing again on the basis of the inputted quantity of modification.

On the other hand, if the CPU 110 determines that the quantity of modification has been finalized, it modifies the quantity of correction of the pertinent facial expression with the finalized quantity of correction (step S37). Thus, it rewrites information on the quantity of correction recorded in the EEPROM 118 to modify the quantity of correction of the pertinent facial expression. In the example shown in FIG. 6B where the quantity of correction of a smiling face is modified, modification is done with the quantity of modification into which the quantity of correction of a smiling face has been inputted.

Figure 6C:
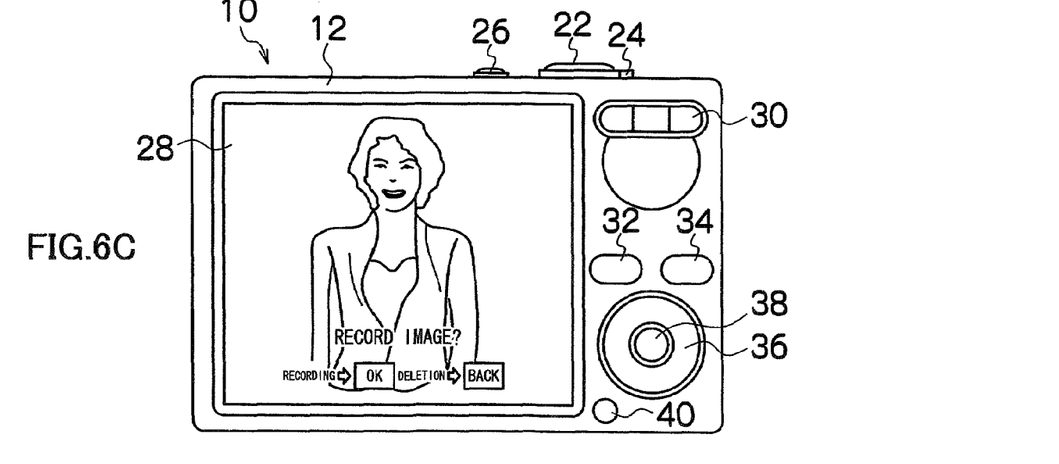

After this modification of the quantity of correction, the CPU 110 switches over the display on the monitor screen 28 to a screen for inquiring about whether or not recording of the picked-up image is required as shown in FIG. 6C. The photographer checks this display on the monitor screen 28 to determine whether or not recording of the picked-up image is required. If the photographer determines that it is required, he or she presses down the MENU/OK button 38 or, if recording is found unnecessary, presses down a DISP/BACK button 40.

The CPU 110 determines according to an input from the operating unit 112 whether or not recording of the picked-up image is required (step S38) and, if recording is found necessary, records the image data of the picked-up image into the memory card 160. Thus the CPU 110, after compressing the image data of the picked-up image stored in the RAM 116 by entering them into the compression/expansion processor 140, records them into the memory card 160 via the media controller 146 as a still image file of a prescribed format.

Incidentally, if it is determined at step S32 that the level of luminescence does not require correction, it is determined according to an input from the operating unit 112 whether or not recording of the picked-up image is required (step S38). If recording is determined to be required, the image data of the picked-up image are recorded into the memory card 160 or, if recording is determined to be unnecessary, no recording is processed to end the sequence. In this case, the image data of the picked-up image stored in the RAM 116 are deleted.

This individual modifiability of the quantity of correction enables the photographer to easily shoot an image of his or her preference. In this case, since the photographer can give an instruction of modification while checking the effect of modification, he or she can easily process modification.

In the above-described case, every time the photographer modifies the quantity of correction the data on the quantity of correction stored in the EEPROM 118 are supposed to be rewritten, but it is also acceptable to store data on the quantity of modification separately and modify the default quantity of correction as appropriate at the time of correction.

In the foregoing case, the supposed image generated at the time of modifying the quantity of correction is not recorded, but the supposed image may as well be recorded.

Figure 7:
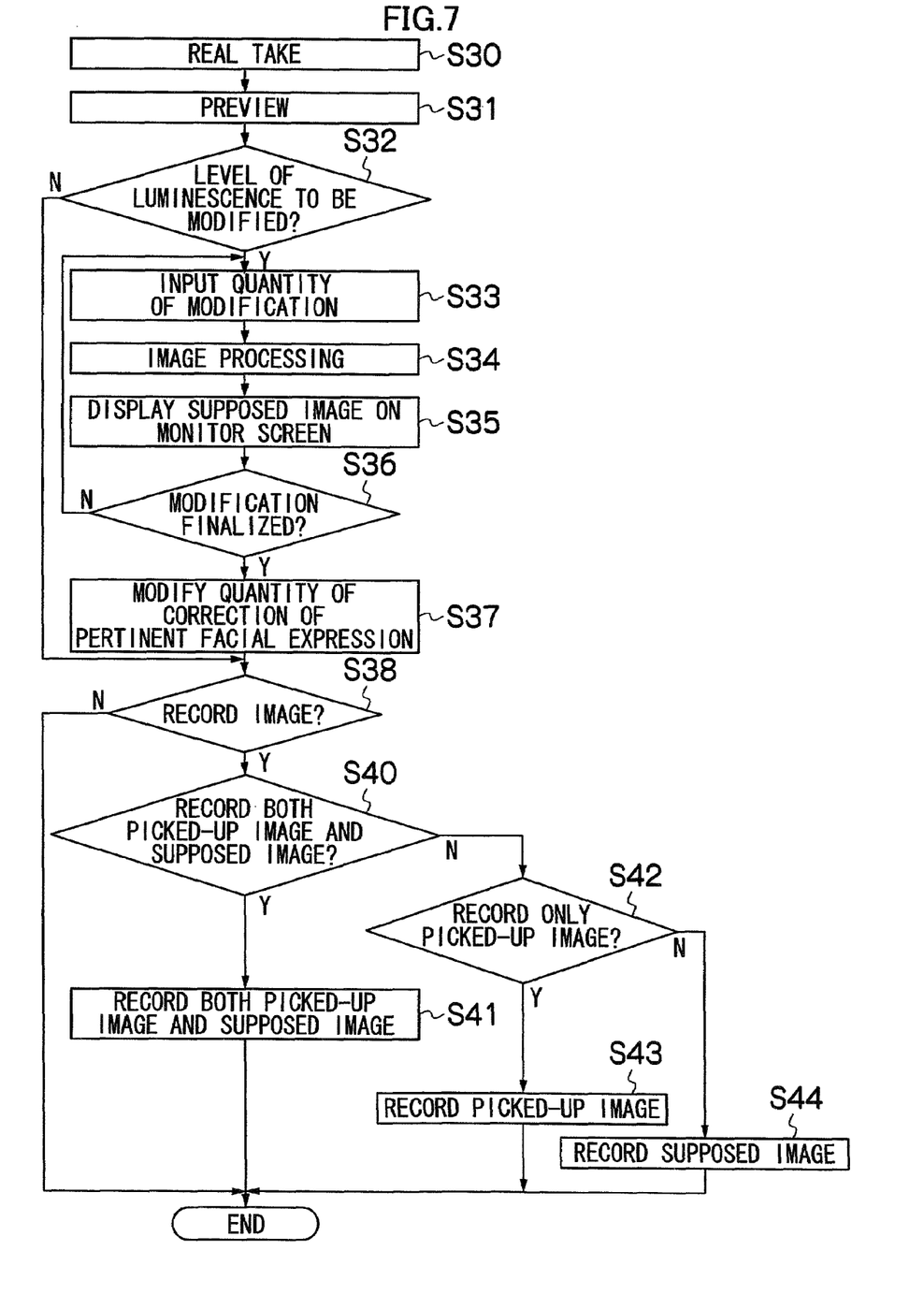
FIG. 7 is a flow chart showing the sequence of modifying the quantity of correction which has made possible recording of a supposed image.

FIG. 7 is a flow chart showing the sequence of modifying the quantity of correction which has made possible recording of the supposed image.

Incidentally, as the processing until the quantity of correction modified with the finalized quantity of modification (pro-cessing until step S37) is the same as the above-described, processing after the modification of the quantity of correction will be described here.

Figure 8A:
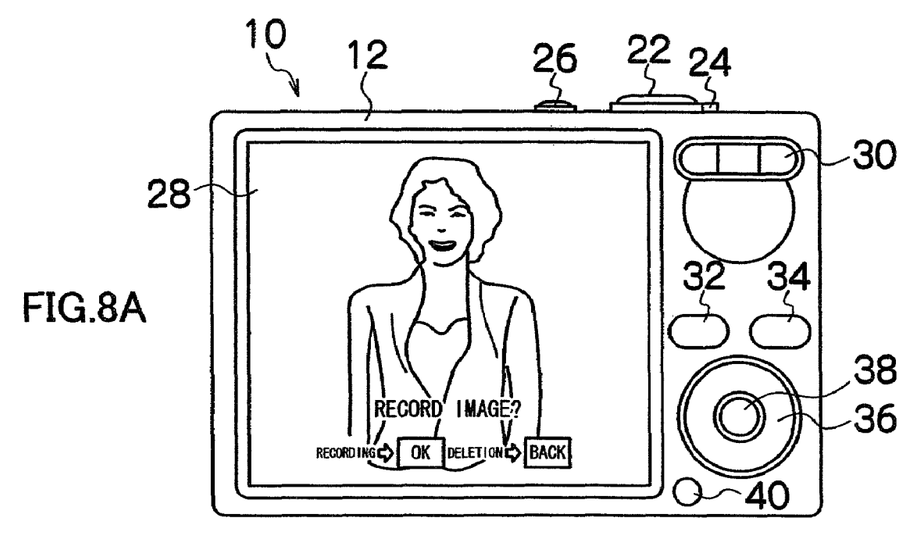
FIGS. 8A and 8B show examples of display on the monitor screen when the quantity of correction is modified.

When the quantity of correction is modified with the finalized quantity of modification (step S37), the CPU 110 switches over the display on the monitor screen 28 to a screen for inquiring about whether or not recording of the picked-up image is required as shown in FIG. 8A. The photographer checks this display on the monitor screen 28 to determine whether or not recording of the picked-up image is required. If the photographer determines that it is required, he or she presses down the MENU/OK button 38 or, if recording is found unnecessary, presses down a DISP/BACK button 40.

Figure 8B:
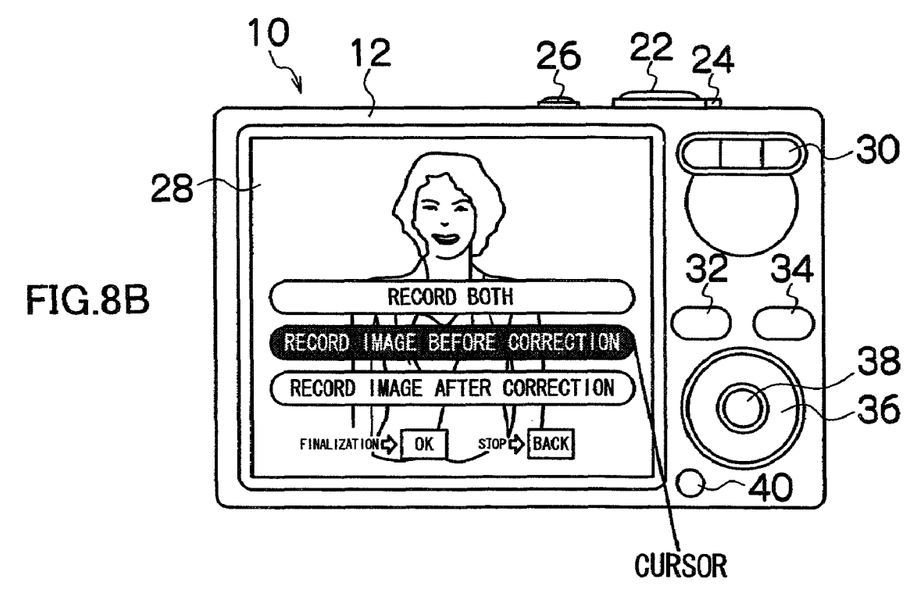

The CPU 110 determines according to an input from the operating unit 112 whether or not recording of the picked-up image is required (step S38) and, if recording is found necessary, switches over the display on the monitor screen 28 to cause a screen for inquiring about the choice of the image to be recorded to be displayed. This screen is for inquiring whether the image before the correction (picked-up image), the image after the correction (supposed image) or the images both before and after the correction are to be recorded. The photographer chooses the image or images to be recorded according to the display on this monitor screen 28. In the case shown in FIG. 8B, the image or images to be recorded can be selected by choosing one of the statements "Record both", "Record image before correction" and "Record image after correction" with the cursor displayed on the monitor screen 28.

The CPU 110 determines according to an input from the operating unit 112 whether or not both the image before the correction (picked-up image) and the image after the correction (supposed image) are to be recorded (step S40). If it determines that both are to be recorded, the CPU 110, after compressing the image data of both the image before the correction (picked-up image) and the image after the correction (supposed image) stored in the RAM 116, records them into the memory card 160 (step S41).

On the other hand, if the CPU 110 determines that both images are not to be recorded, it determines whether or not only the image before the correction (picked-up image) is to be recorded (step S42). If it determines that only the image before the correction (picked-up image) is to be recorded, the CPU 110, after compressing only the image data of the image before the correction (picked-up image) stored in the RAM 116, records them into the memory card 160 (step S43). Or if it determines not to record the image before the correction (picked-up image), the CPU 110 determines that only the image after the correction (supposed image) is to be recorded and, after compressing only the image after the correction (supposed image) stored in the RAM 116, records them into the memory card 160 (step S44).

That the image after the correction (supposed image) can be recorded in this way eliminates the need for re-shooting and facilitates acquisition of any image the photographer likes.

Although the image to be recorded is selected in the above-described case, it is also acceptable to permit recording of only the image after the correction (supposed image).

Also, though the modification of the quantity of correction is supposed to be processed immediately after shooting in the above-described case, the quantity of correction can also be made modifiable on the basis of an already shot image. Thus, the image data of an image of a facial expression to be modified shot with flash lighting at its level of luminescence may be read out of the memory card 160 and the pertinent image data may be subjected to the modification processing described above.

Also, dedicated modes such as a level of luminescence modifying mode are made available, and the modification processing described above can be executed on an image shot in that mode. In this case, it is preferable for recording of the image shot in that mode and the supposed image to be made possible according to the user's choice.

Figure 9:
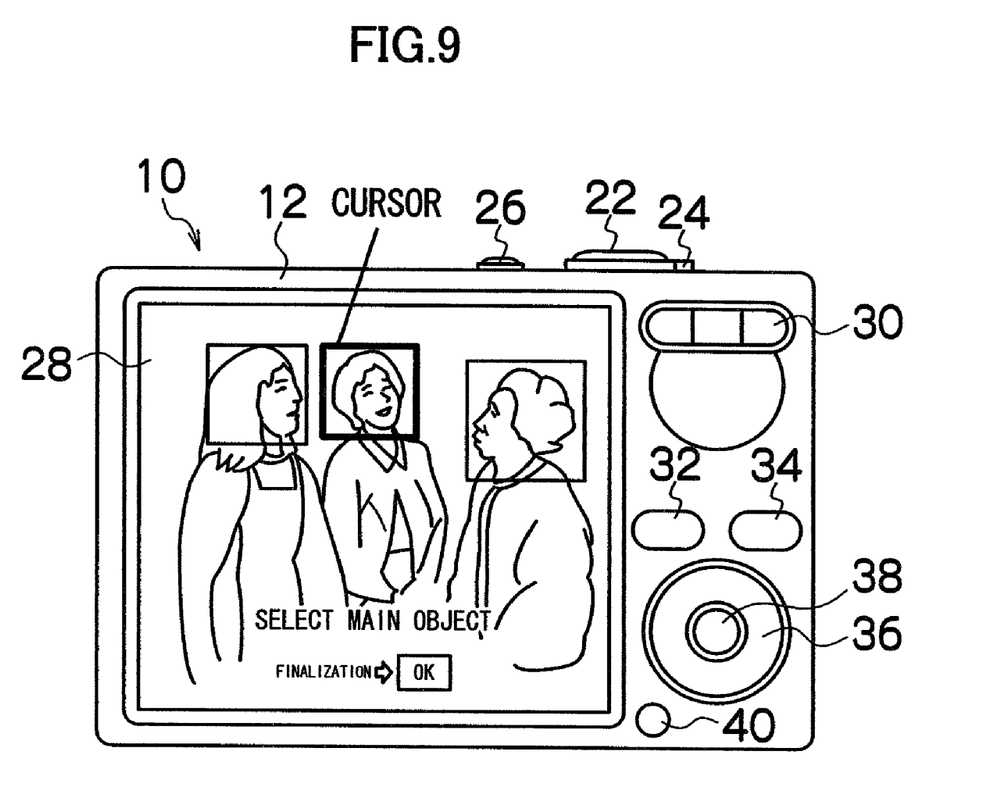
FIG. 9 shows an example of display on the monitor screen when a human object is selected.

Although the description of the foregoing embodiment referred to a case in which only one person was to be portrayed, if the faces of a plurality of persons are detected in an image to be picked up, it is preferable for the level of luminescence to be corrected on the basis of the facial expression of the person chosen by the photographer. The configuration for the choice may be such that, for instance, the faces of detected persons are marked with frames as shown in FIG. 9, and the photographer is enabled to choose one of them with the cursor.

Other alternatives include detection of the face of a person near the center of the image and correction of the level of luminescence on the basis of the facial expression of this person, and detection of the face of the person who is shot in the biggest size in the image and correction of the level of luminescence on the basis of the facial expression of this person. Another possibility is to detect the faces of all the persons in the image and to correct the level of luminescence on the basis of the most frequently appearing type of facial expression.

While the above-described embodiment referred the application of the present invention to flash photography, the invention is applicable to shooting of a so-called moving picture under illumination with video light. Namely, when a moving picture is to be shot, the level of luminescence of video light is corrected according the facial expression and attributes of the object. In this case, facial expressions may be consecutively detected to correct level of luminescence on the basis, or facial expressions may be detected at regular intervals to correct the level of luminescence accordingly.

The application of the invention is not limited to digital cameras, but can also be applied to other imaging apparatuses including mobile phones with camera and video camera.

What is claimed is:

1. An imaging apparatus comprising:
   an image pickup device which picks up the image of an object;
   an illuminating device which emits an illuminating light at a prescribed level of luminescence;
   an extracting device which extracts the face of a person from the image picked up by the image pickup device;
   a determining device which determines the facial expression and/or attributes of the person from the facial image of a person extracted from the extracting device;
   a corrective information storage device in which information on the quantity of correcting the level of luminescence of the illuminating light according to the facial expression and/or attributes of the person is stored; and
   a correcting device which corrects the level of luminescence of the illuminating light with a quantity of correction matching the facial expression and/or attributes determined by the determining device, further comprising a modifying device which individually modifies the quantities of correction stored in the corrective information storage device.

2. The imaging apparatus according to claim 1, wherein the modifying device includes:
   an image acquiring device which acquires an image picked up with an illuminating light emitted from the illuminating device as a picked up image after correcting the level of luminescence with the quantity of correction to be modified;
   an input device which inputs the quantity of modification;
   an image generating device which generates an image supposed to be obtained after correction with the quantity of modification inputted from the input device as a supposed image by correcting the picked up image according to the quantity of modification inputted from the input device;
   a display device which displays the supposed image; and
   an instructing device which instructs the finalization of the quantity of modification inputted from the input device, and
   the quantity of modification finalized by the instructing device is used as the quantity of modification of the quantity of correction.

3. The imaging apparatus according to claim 2, further comprising:
   a recording instruction device which instructs recording of the supposed image; and
   a recording control device which records on a recording medium in accordance with the recording instruction by the recording instruction device the supposed image.

4. An imaging apparatus comprising:
   an image pickup device which picks up the image of an object;
   a display device which displays the image;
   an illuminating device which emits an illuminating light at a prescribed level of luminescence;
   an extracting device which extracts the face of a person from the image picked up by the image pickup device;
   a determining device which determines the facial expression and/or attributes of the person from the facial image of a person extracted from the extracting device;
   a corrective information storage device in which information on the quantity of correcting the level of luminescence of the illuminating light according to the facial expression and/or attributes of the person is stored;
   a correcting device which corrects the level of luminescence of the illuminating light with a quantity of correction matching the facial expression and/or attributes determined by the determining device;
   an image acquiring device which acquires an image picked up with an illuminating light emitted from the illuminating device as a picked up image from the image pick up device after correcting the level of luminescence with the correcting device; and
   a recording control device which records on a recording medium the picked up image.

5. The imaging apparatus according to claim 4, further comprising a modifying device which modifies a quantity of correction stored in the corrective information storage device, wherein the modifying device includes:
   a device which displays the picked up image on the display device;
   an input device which inputs a quantity of modification for modifying the quantity of correction of the level of luminescence corrected when the picked up image is picked up; and
   a device which modifies the quantity of correction of the level of luminescence corrected when the picked up image is picked up, with the quantity of correction inputted by the input device.

6. The imaging apparatus according to claim 5, wherein the modifying device further includes;
   an image generating device which generates an image supposed to be obtained after modification with the quantity of modification inputted from the input device as a supposed image by correcting the picked up image according to the quantity of modification inputted from the input device; and
a device which displays the supposed image on the display device.

7. The imaging apparatus according to claim 6, further comprising:
a recording instruction device which instructs the recording of the supposed image, and
a recording control device which records on a recording medium in accordance with the recording instruction by the recording instruction device the supposed image.

8. The imaging apparatus according to claim 7, wherein the recording instruction device instructs the recording of one of or both of the supposed image and the picked up image, and
the recording control device records one of or both of the supposed image and the picked up image on the recording medium in accordance with the recording instruction by the recording instruction device.

9. The imaging apparatus according to claim 4, further comprising a modifying device which modifies a quantity of correction stored in the corrective information storage device, wherein the modifying device includes;
a device which displays the picked up image on the display device;
an input device which inputs a quantity of modification for modifying the quantity of correction of the level of luminescence corrected when the picked up image is picked up;
an instructing device which instructs the finalization of the quantity of modification inputted from the input device;
a device which modifies the quantity of correction of the level of luminescence corrected when the picked up image is picked up, with a quantity of correction inputted by the input device.

10. The imaging apparatus according to claim 9, wherein the modifying device further includes;
an image generating device which generates an image supposed to be obtained after modification with the quantity of modification inputted from the input device as a supposed image by correcting the picked up image according to the quantity of modification inputted from the input device; and
a device which displays the supposed image on the display device.

11. The imaging apparatus according to claim 10, further comprising:
a recording instruction device which instructs the recording of the supposed image, and
a recording control device which records on a recording medium in accordance with the recording instruction by the recording instruction device the supposed image.

12. The imaging apparatus according to claim 11, wherein the recording instruction device instructs the recording of one of or both of the supposed image and the picked up image, and
the recording control device records one of or both of the supposed image and the picked up image on the recording medium in accordance with the recording instruction by the recording instruction device.

13. An imaging method comprising:
a step of picking up the image of an object by pre-lighting an illuminating light with a prescribed level of luminescence;
a step of determining the level of luminescence of the illuminating light at the time of real take from the picked up image;
a step of extracting the face of a person from the picked up image;
a step of determining the facial expression and/or attributes of the person from the facial image of a person extracted from the extracting device;
a step of correcting the level of luminescence of the illuminating light at the time of real take with the quantity of correction depending on the determined facial expression and/or attributes, by referring to the information on the quantity of correction of the level of luminescence set for each facial expression and/or attributes;
a step of real taking by emitting the illuminating light with the corrected level of luminescence; and
a step of recording the picked up image obtained by the real take on the recording medium.

14. The imaging method according to claim 13, further comprising:
a step of displaying the picked up image on the display device after the real take;
a step of inputting a quantity of modification for modifying the quantity of correction of the level of luminescence corrected when the picked up image is picked up; and
a step of modifying the quantity of correction of the level of luminescence corrected when the picked up image is picked up with the quantity of modification inputted.

15. The imaging method according to claim 14, further comprising:
a step of generating an image supposed to be obtained after modification with the quantity of modification inputted from the input device as a supposed image by correcting the picked up image according to the quantity of modification inputted, and displaying the supposed image on the display device.

16. The imaging method according to claim 15, further comprising:
a step of instructing the recording of the supposed image generated; and
a step of recording on a recording medium in accordance with the recording instruction of the supposed image the supposed image.

17. The imaging method according to claim 13, further comprising:
a step of displaying the picked up image on a display device after the real take;
a step of inputting a quantity of modification for modifying the quantity of correction of level of luminescence corrected when the picked up image is picked up;
a step of instructing the finalization of the quantity of modification inputted; and
a step of modifying the quantity of correction of the level of luminescence corrected when the picked up image is picked up with the quantity of modification finalized.

18. The imaging method according to claim 17, further comprising:
a step of generating an image supposed to be obtained after modification with the quantity of modification inputted from the input device as a supposed image by correcting the picked up image according to the quantity of modification inputted, and displaying the supposed image on the display device.

19. The imaging method according to claim 18, further comprising:
a step of instructing the recording of the supposed image generated; and
a step of recording on a recording medium in accordance with the recording instruction of the supposed image the supposed image.

* * * * *